United States Patent [19]
Hirai

[11] Patent Number: 5,957,485
[45] Date of Patent: Sep. 28, 1999

[54] DUAL AIR BAG STRUCTURE WITH AN ELASTOMER INNER AIR BAG AND A METHOD OF FORMING THEREOF

[75] Inventor: Kinji Hirai, Tokyo, Japan

[73] Assignee: Takata Corporation, Tokyo, Japan

[21] Appl. No.: 08/670,680

[22] Filed: Jun. 26, 1996

[51] Int. Cl.[6] ................................................. B60R 21/24
[52] U.S. Cl. ................................. 280/729; 280/743.1
[58] Field of Search ............................ 280/728.1, 731, 280/743.1, 739, 729

[56] References Cited

U.S. PATENT DOCUMENTS

| | | | |
|---|---|---|---|
| 3,473,824 | 10/1969 | Carey et al. | 280/150 |
| 3,511,519 | 5/1970 | Martin | 280/739 |
| 3,527,475 | 9/1970 | Carey et al. | 280/739 |
| 3,814,458 | 6/1974 | Acs | 280/150 |
| 3,900,210 | 8/1975 | Lohr et al. | 280/150 |
| 3,990,726 | 11/1976 | Oka et al. | 280/739 |
| 5,195,774 | 3/1993 | Morita | 280/731 |
| 5,226,671 | 7/1993 | Hill | 280/743.1 |
| 5,249,824 | 10/1993 | Swann et al. | 280/729 |
| 5,263,738 | 11/1993 | Oda et al. | 280/728.2 |
| 5,452,914 | 9/1995 | Hirai | 280/743.1 |
| 5,501,259 | 3/1996 | Palm | 280/743.1 |
| 5,536,038 | 7/1996 | Bollaert et al. | 280/739 |

FOREIGN PATENT DOCUMENTS

| | | | |
|---|---|---|---|
| 1-311930 | 12/1989 | Japan . | |
| 3-281460 | 12/1991 | Japan . | |
| 3271041 | 12/1991 | Japan | 280/743.1 |
| 4-244453 | 9/1992 | Japan | 280/743.1 |
| 2252983 | 8/1992 | United Kingdom | 280/728.1 |
| 2265118 | 9/1993 | United Kingdom | 280/729 |

*Primary Examiner*—Paul N. Dickson
*Attorney, Agent, or Firm*—Foley & Lardner

[57] ABSTRACT

An air bag structure includes an outer air bag having an internal cavity and an inlet portion. An inner air bag with an inlet portion is disposed within the internal cavity of the outer air bag so that the inlet of the outer air bag and the inlet of the inner air bag are fastened to a vehicle structure at a common point. The inner air bag is a monolithic member with at least one gas flow control device.

22 Claims, 5 Drawing Sheets

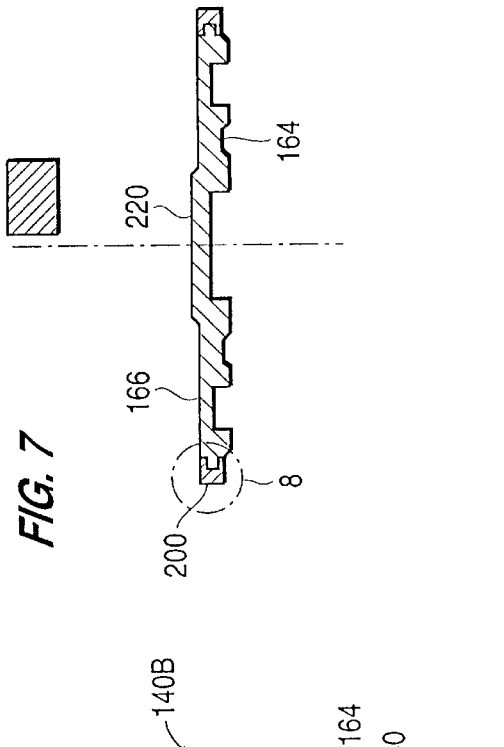
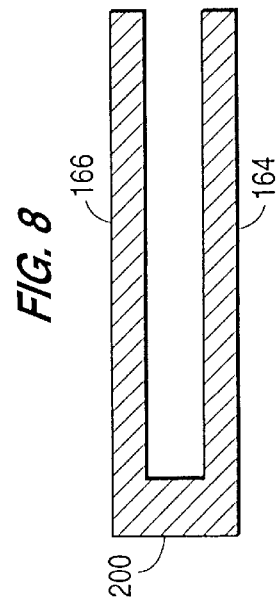
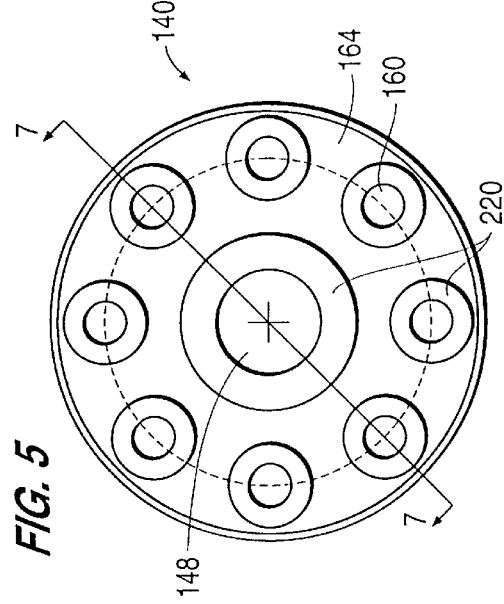
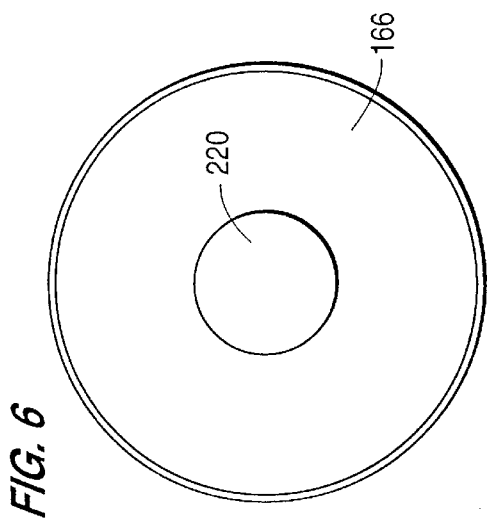

DUAL AIR BAG STRUCTURE WITH AN ELASTOMER INNER AIR BAG AND A METHOD OF FORMING THEREOF

FIELD OF THE INVENTION

The present invention relates to a vehicle air bag structure. In particular, the present invention relates to a vehicle air bag of the "bag-within-a-bag" type air bag structure, wherein an inner bag is disposed within an outer bag. The present invention also relates to a method of forming the inner air bag.

BACKGROUND OF THE INVENTION

An air bag assembly usually comprises an air bag structure housed within a container. The air bag is typically stored in the container in a folded state. The air bag is inflated by a gas or fluid ejected by a gas generator or inflator that is in close proximity to the container.

After a vehicle collision begins, the gas generator is actuated so that an inert, non-toxic gas such as nitrogen is directed into the air bag structure. The gas is fed into the air bag structure through an air bag inlet. Upon inflation of the air bag structure, the container, which is typically mounted in a part of the instrument panel or steering wheel column, is broken and the air bag structure inflates so that the vehicle passenger is protected from injury.

A known type of air bag structure is referred to as a "bag-within-a-bag" structure. This type of structure, typically, comprises an inner bag disposed within an outer bag. The inner bag usually receives gas from the gas generator, and, subsequently, directs the gas into the outer bag so that the outer bag inflates to its necessary configuration to protect the passenger.

Various types of bag-within-a-bag air bag structures have been disclosed in the art. For example, U.S. Pat. No. 3,473,824 discloses an inner bag that ruptures so that an outer bag can be filled to protect the occupant of the vehicle during a collision. Because the bag is ruptured at some point during inflation, it is difficult to control the manner in which the outer air bag is expanded.

Another bag-within-a-bag type air bag structure has been disclosed by U.S. Pat. No. 5,249,824. This patent discloses an inner bag of a bag-within-a-bag air bag structure with venting holes in order to control the manner in which the inner bag inflates the outer bag during a vehicle collision. The vent holes direct fluid out of the inner bag in directions which are outward (lateral) from the central axis thereof. Thus, the inner air bag is difficult to manufacture and provides only a single control device to attempt to control the gas flow into the outer air bag.

Most of the prior art discloses that the inner bag of the "bag-within-a-bag" type dual air bag structure is formed of flexible fabric material, such as nylon. The inner air bag is typically formed of the same nylon material as that of the outer air bag. Although, nylon is typically the material used for an inner air bag in a dual air bag structure, other materials have been disclosed. For example, U.S. Pat. No. 3,900,210 discloses an elastic knitted inner bag. This material absorbs kinetic energy from the fluid or the gas ejected from an inflator; this absorption results in the peak sound reduction. U.S. Pat. No. 3,814,458 discloses fiberglass as the material for the inner air bag. The fiberglass material absorbs heat and kinetic energy from the inflator fluid.

Even though the prior art discloses a bag-within-a-bag type air bag structures, the prior art fails to specifically provide an air bag device that is easy to manufacture, that includes an inner bag with a plurality of devices to control the flow of gas from the inner bag to the outer bag during inflation, and, in addition, that includes an inner air bag composed of an elastomer to provide an effective kinetic energy absorption capacity of a dual air bag structure.

SUMMARY OF THE INVENTION

One objective of the present invention is to provide an air bag structure of the bag-within-a-bag type, which can be efficiently and economically manufactured in mass production techniques. Another objective of the present invention is to provide an air bag structure capable of controlling the flow of gas between the inner bag and the outer bag of the air bag structure.

These objectives are achieved by providing a vehicle air bag structure which comprises an outer bag and an inner bag. The outer bag has an internal cavity and an inlet portion. The inner bag also has an inlet portion and is disposed within the internal cavity of the outer bag. The inlet portions of the inner bag and the outer bag are connected to the vehicle structure at a common point. This common point connection forms a common inlet for both the inner bag and the outer bag.

These objectives of the invention are further achieved by providing the inner bag as a monolithic member; that is, the inner bag is formed from one unitary material. Additionally, the inner bag is formed with at least one gas flow control device, preferably a vent hole, that controls the flow of gas from the inner bag to the outer bag during inflation of the air bag structure.

In a preferred embodiment, the inner bag of an air bag structure is comprised of thermoplastic elastomers, preferably urethane. The inner bag is preferably molded during a manufacturing process so that the inner bag is a single unitary structure, i.e., monolithic. Also, the molded monolithic inner bag is formed with a plurality of vent holes that control the flow of gas from the inner air bag to the outer air bag during inflation of the air bag structure. Another objective of the invention provides an inner air bag that can be efficiently manufactured, while still providing an effective method of controlling the flow of air between the inner bag and the outer bag during a vehicle collision.

This objective is achieved by providing an inner bag that comprises a monolithic member. The monolithic member includes a front portion and a rear portion. The rear portion is preferably provided with the plurality of vent holes discussed above. Additionally, in an alternate embodiment of the invention, the vent holes can be provided, partially, in both the rear portion and the front portion so that during inflation of the inner air bag the vent holes are effectively configured in the side of the inner bag.

An additional objective of the invention is to provide an inner air bag with a supplemental control device, in addition to, or instead of the vent holes of one preferred embodiment. This objective is achieved by providing at least one weakened portion in the material used to form the inner air bag so that the inner air bag punctures at some point during inflation, and, thus, allows rapid flow of gas from the inner air bag to the internal cavity of the outer air bag.

An additional objective of the present invention is to provide a method of forming an air bag. This objective is achieved by molding an inner air bag from thermoplastic elastomers. Preferably, a thermoplastic elastomer, such as thermoplastic polyurethane, which is suitable to manufacture by injection molding.

A further objective of the present invention is to provide a new dual air bag design with an effective kinetic energy absorption capability. The absorption capacity determines the safety of an occupant who is pitched toward a structural part of the vehicle by the force of a collision.

These objectives of the present invention are achieved by using a combination of materials for the outer bag and the inner bag having an elasticity that enhances the kinetic energy absorption capability of the dual air bag structure. In particular, these objectives of the present invention are achieved by adopting a thermoplastic elastomer for the inner bag. This type of inner air bag with the outer air bag cushions a moving occupant in a vehicle collision more effectively than other materials, especially flexible nylon fabric that is typically used for an inner air bag.

Furthermore, the present invention allows for more efficient manufacturing methods (molding techniques) than the prior art method (sewing) typically used to join the fabric panels of the prior art inner bags, because of the thermoplasticity of the elastomers used to form the inner air bag of the present invention. This method of forming an air bag includes providing a first thermoplastic panel and a second thermoplastic panel, and then connecting said first thermoplastic panel to said second thermoplastic panel by a thermoplastic edge. More particularly, the connecting step includes forming a bonded thermoplastic edge between said first thermoplastic panel and said second thermoplastic panel by injection molding.

Further objects, features and advantages of the present invention will become apparent from the detailed description of preferred embodiments which follow.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiments given below, serve to explain the principles of the invention.

FIG. 5 shows a rear view of a further embodiment of an inner air bag of the present invention;

FIG. 6 show s a front view of the embodiment of the inner air bag shown in FIG. 5;

FIG. 7 shows a cross-sectional of the inner air bag view taken along the line 7—7 in FIG. 5; and FIG. 8 shows the encircled portion of the inner air bag shown in FIG. 7.

DETAILED DESCRIPTION OF THE PREFERRED EMBODIMENTS

Figure 1:
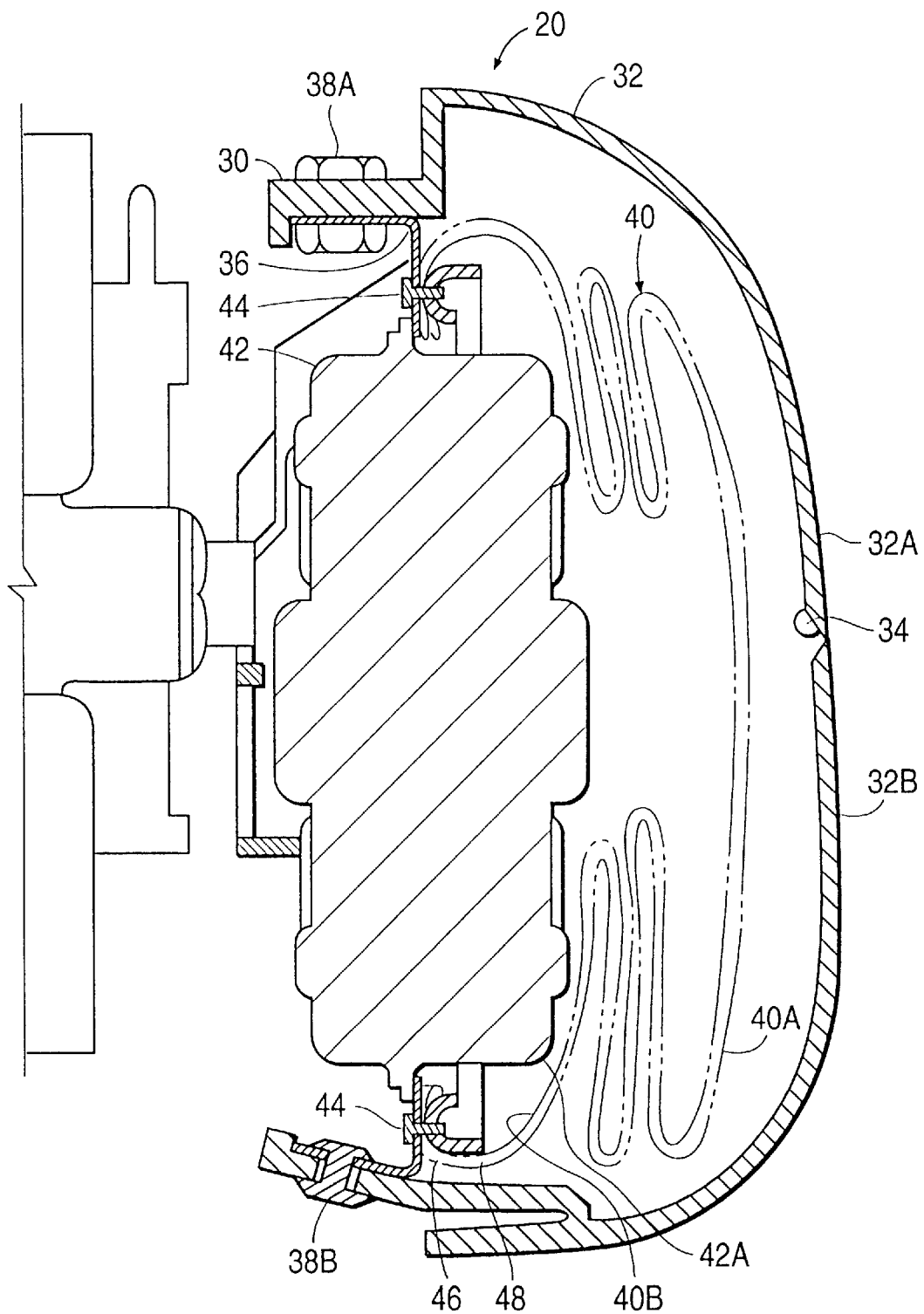
FIG. 1 is a sectional view of an air bag assembly incorporating the air bag structure constructed according to the present invention.

FIG. 1 shows an air bag assembly 20 that incorporates the air bag structure 40 of the present invention. The air bag assembly 20 includes a container 30 that houses the air bag structure 40. The container 30 includes a cover 32 that is fixedly connected to a retainer 36, preferably a plate. The cover 32 is fixedly connected to the retainer 36 by a fastener. The fastener may comprise any type of fastener known to those of skill in the art for fastening two structural members together. For example, the cover 32 and retainer 36 may be connected by a bolt 38A or a rivet 38B shown in FIG. 1. The cover 32 is provided with a groove 34 that creates a weakened segment that allows the cover 32 to break into two portions 32A and 32B during deployment of the air bag structure 40.

A gas generator 42 is provided in the air bag assembly to dispense gas into the air bag structure 40 during a vehicle collision. The gas generator 42 is preferably provided with a gas dispensing section 42A. The gas generator 42 can have various known constructions available in the art, as long as the gas generator provides a gas to the internal space of the air bag structure 40 during a vehicle collision.

Figure 2:
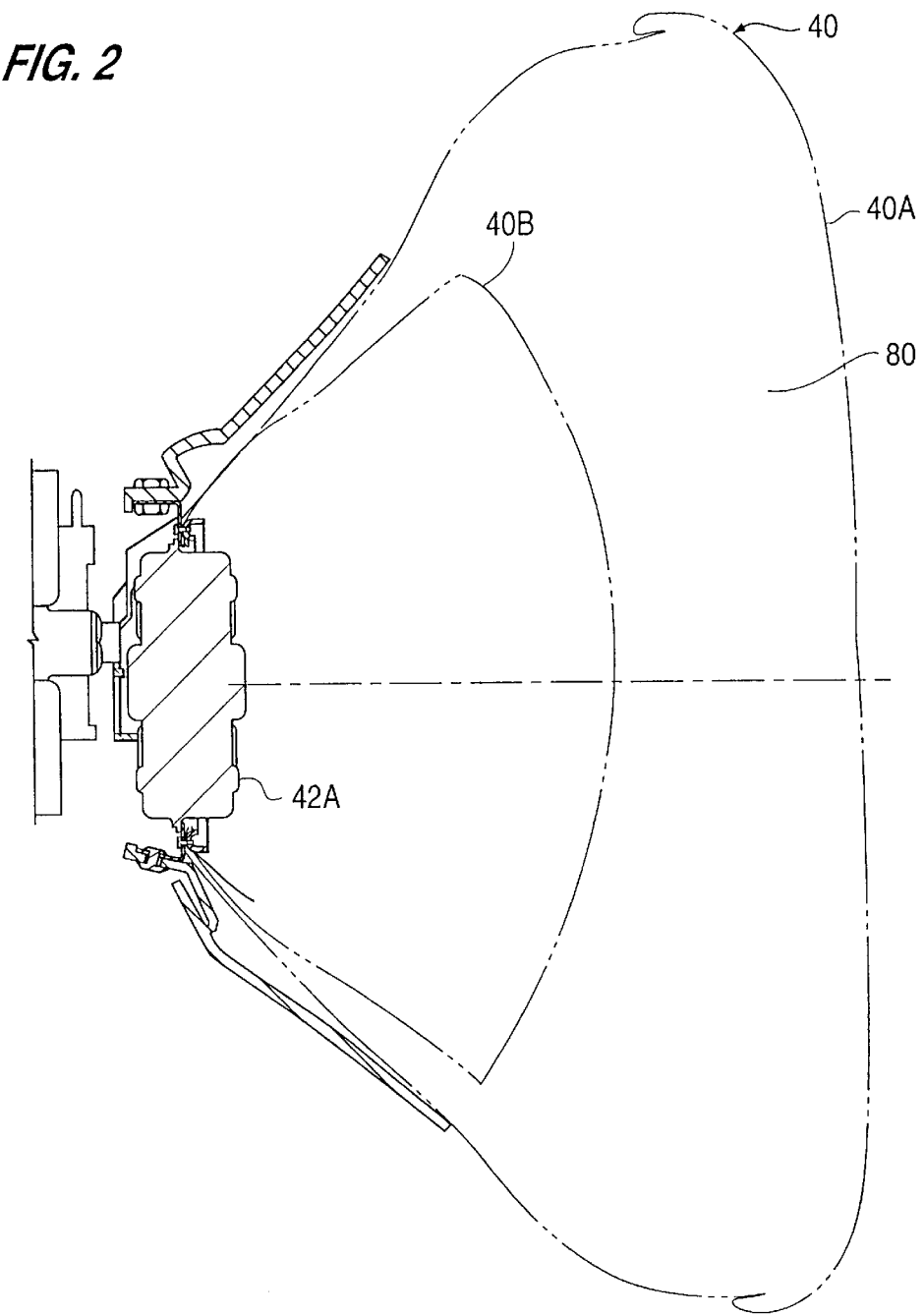
FIG. 2 is a schematic view of the air bag assembly of FIG. 1, with the air bag structure inflated to its predetermined configuration.

Thus, when a vehicle collision occurs, the gas generator is actuated so that a gas, typically a non-toxic gas such as nitrogen, is discharged from the gas dispensing section 42A. As shown in FIG. 2, the gas emitted from the gas dispensing section 42A fills an inner air bag 40B of the air bag structure 40. The inner air bag 40B expands in an internal cavity 80 of the outer air bag 40A provided in the air bag structure 40.

In order to attach the air bag structure 40 to the air bag assembly 20, each of the air bags is provided with an inlet that is connected to the same point of the air bag assembly 20. For example, as shown in FIG. 1, the outer air bag 40A is provided with an inlet 46, while the inner air bag 40B is provided with an inlet 48. Both of the inlets 46 and 48 of the outer air bag 40A and the inner air bag 40B are connected to the retainer 36 by a plurality of fastening members. As shown in FIG. 1, rivets 44 are used to form this connection. It is to be understood that any suitable connection can be used as long as the connection forms an airtight seal between the retainer 36 and the inlets 46 and 48 of the respective air bags 40A and 40B.

Figure 3:
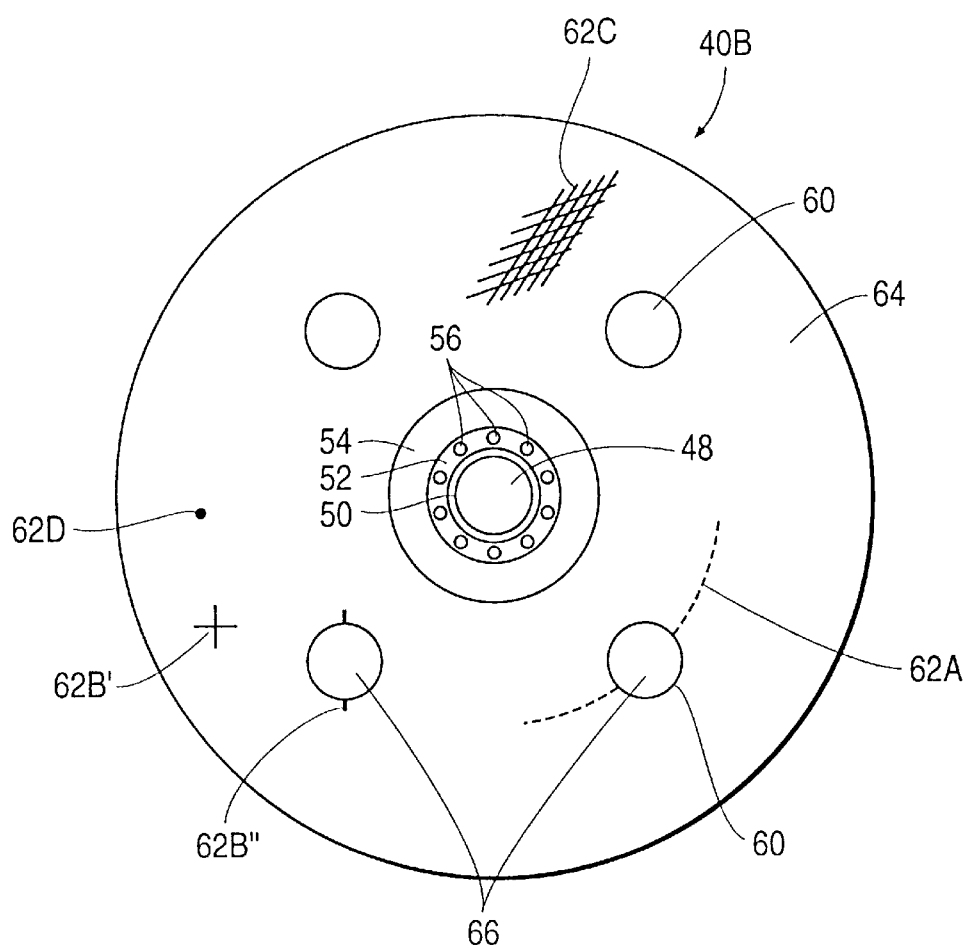
FIG. 3 shows a rear view of the inner bag of the air bag assembly in a deflated state.

As shown in FIG. 3, the inner air bag 40B is provided with a plurality of mounting holes 56. Although not shown, the outer air bag 40A is also provided with a plurality of mounting holes that correspond to the mounting holes 56 so that the inlets 46 and 48 of the inner air bag 40B and the outer air bag 40A can be attached to the common point of the air bag assembly, i.e., retainer 36.

During inflation of the air bag structure 40, as discussed above, the inner air bag 40B initially receives the gas emitted from the gas dispensing section 42A of the gas generator 42. As the inner air bag 40B inflates, gas is transferred from the inner air bag 40B through a plurality of vent holes 60 formed in a rear portion 64 as shown in FIG. 3. As used in the descriptions of the invention, the term vent hole is defined as a preformed opening in the inner air bag. The vent holes effectively provide a device that controls the flow of gas from the inner air bag 40B to the outer air bag 40A. It is to be understood that the rear portion 64 has a corresponding front portion 66, which portion is partially shown through the vent holes 60 in FIG. 3, so that the air bag forms a monolithic or one-piece member.

The inner air bag 40B of the present invention is preferably formed from a thermoplastic elastomer. Although in the preferred embodiment of the invention a thermoplastic elastomer is employed as the material for the inner air bag 48, any material may be employed so that the inner bag may be molded and formed as a monolithic member. In forming the preferred embodiment of the inner bag injection blow molding or injection molding is used. By using either of these processes, the inner bag 40B is formed without a seam or attaching segment.

Figure 4:
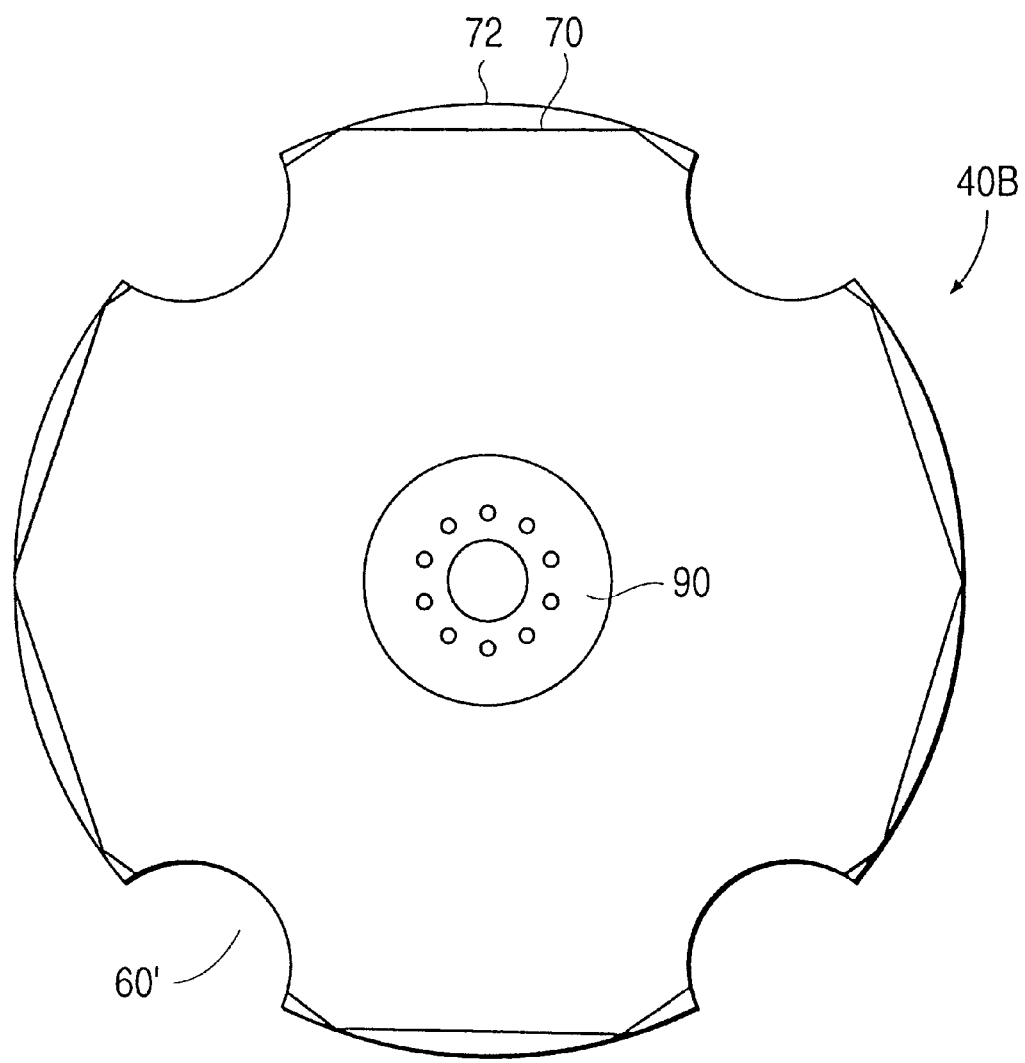
FIG. 4 shows an alternative embodiment of the inner air bag shown in FIG. 3.

Alternatively, by using a direct blow molding process, the inner air bag is molded with at least one air-tight segment 70 forming an air-tight seam between the rear portion 64 and the front portion 66, as shown in the alternative embodiment of FIG. 4. Reference numeral 72 shows an excess portion of material that has been formed outside the segment during the manufacturing process. This excess material may be discarded. Alternatively, the excess material is left on the air bag to protect the segment 70. As shown in the alternative embodiment of FIG. 4, the inner air bag 40B is provided with a plurality of air-tight segments 70 (ten as illustrated), however, the air bag may be formed with any number of segments. For example, the inner air bag could be formed so a single circular segment is provided. Accordingly, the particular configuration of the segment that forms the boundary of the inner air bag between the first portion 64 and the second portion 66 can be selected so that the inner air bag performs its required function, and also such that the manufacturing process may be carried out in an efficient manner.

As discussed above, the inner air bag 40B is provided with an inlet portion 48. In order to facilitate mounting of the inner air bag 40B with the outer air bag 40A, the inner air bag 40B is provided with various annular strengthened portions. These annular strengthened portions are formed during the molding process by providing the portions with different material thicknesses. The inner air bag is provided with these portions so that the air bag can effectively deliver the gas provided by the gas generator to the outer air bag.

Particularly, the inner annular portion 50 of the inner air bag is provided with the greatest thickness because it is used as part of the support to mount the inlet 48 to the retainer 36 as a reaction member. Moving from the inner annular portion 50 to the intermediate annular portion 52, the thickness of these different areas decreases. As shown in FIG. 3, the intermediate annular portion 52 is provided with the plurality of holes 56. Accordingly, during manufacturing, the thickness of these annular sections is selected so that they can achieve their respective functions. The intermediate annular portion 52 must be molded to a thickness so that the mounting holes 56 will stay intact during inflation of the inner air bag 40B. For example, the intermediate circular portion 52 is provided with a thickness three times the thickness of the remaining rear portion of the inner air bag 40B. Furthermore, an outer annular portion 54 is provided with a thickness in the inlet area 48 to withstand the force and heat exerted on the inner air bag 40B from the gas emitted from the gas dispensing section 42A. The outer annular portion 54 is preferably not as thick as the thickness of the intermediate annular portion 52.

Alternatively, the inner annular portion 50, the intermediate annular portion 52, and the outer annular portion 54 are provided with the same thickness, which is greater than the thickness of the remaining area of the rear portion 64. Accordingly, the inner air bag is provided with one strengthened portion 90 as shown in the alternative embodiment of FIG. 4.

Furthermore, the various thicknesses of the annular portions 50, 52, 54 can be formed by attaching one or more sheets of the same or different material after the molding process.

As discussed above, FIG. 4 shows an alternative embodiment of the monolithic inner air bag 40B of the present invention. Similar to the air bag shown in FIG. 3, the inner air bag of FIG. 4 is preferably formed from a thermoplastic elastomer during a molding process. However, in the embodiment of the air bag shown in FIG. 4, the vent holes 60' are located on the periphery of the two portions used to form the air bag. It is to be understood that the vent holes 60 shown in FIG. 3 could also be arranged in this manner. Accordingly, during inflation of the inner air bag 40B, the vent holes effectively direct the gas in a direction radially outward from the inner air bag 40B into the internal cavity 50 of the outer air bag 40A. In a further modification of this embodiment, vent holes can be provided in both the rear portion 64 and the periphery of the two portions of the inner air bag 40B, so that the inner air bag has vent holes facing in a plurality of directions.

In a further embodiment of the invention, the monolithic inner air bag 40B of FIGS. 3 and 4 is provided with a supplemental control device for controlling the flow of gas between the inner air bag 40B and the outer air bag 40A during a vehicle collision. This supplemental control device is preferably an intentionally or deliberately weakened portion provided in the material that is used to form the inner air bag 40B. The intentionally weakened portion can be provided in the rear portion 64, the front portion 66, or both. By selecting the location of the intentionally weakened portion, the rate and direction of deployment of the outer air bag 40A can be effectively controlled.

FIG. 3 shows the different examples of embodiments of the weakened portion that can be used singularly or in combination with each other. For example, the weakened portion can comprise a plurality of slots or slits 62A that are scored into the thermoplastic elastomer that the inner air bag is formed from. The slots 62A can be scored through the material, only in the surface of the material, or both. Moreover, the slots 62A can be provided as weakened portions extending from the vent holes 60, formed in the material offset from the vent holes, 60 or both.

Additionally, the weakened portion can comprise a tear or cut. The cut can be a cross shape, as shown by cross-cut 62B' in FIG. 3. Moreover, the tear or cut 62B" can extend from the vent holes 60. Alternatively, the weakened portion can be formed during the molding process by providing a thinned area of material 62C in the rear panel 64. It is to be understood that the thinned portion can be provided in a plurality of locations in either the rear portion, the front portion, or both. It is preferred that the thinned portion be shaped as a circle or a rectangle; however, any geometric shape is applicable as long as it provides the required weakened portion. A further embodiment of the weakened portion comprises a small pin hole 62D provided in one of the portions that comprise the inner air bag 40B.

By providing an intentionally weakened portion in the air bag portions, the air bag punctures or more particularly ruptures during deployment of the air bag structure 40. Because the exemplary weakened portions discussed above may either be provided individually in the inner air bag or in combination with one another, the weakened portions provide a supplemental control device for the inner air bag. The selection of the particular type of weakened portion is based upon the configuration that the air bag structure is to be employed in and the particular materials used in forming the outer air bag 40A. Accordingly, by providing the inner air bag 40B with both at least one venting hole 60 and at least one weakened portion 62A–D, the inner air bag 40B is provided with a plurality of devices that control the flow of gas from the inner air bag 40B to the outer air bag 40A. Also, the inner air bag 40B may be provided only with a plurality of weakened portions to form the gas flow control devices.

The outer air bag 40A in this preferred embodiment is formed from a common fabric, such as nylon. The outer air bag 40A comprises a front and rear panel that are sewn together in order to form an air tight seal. A system comprising an outer air bag of two separate panel members sewn together and an inner bag of a monolithic member, discussed above, achieves an advantageous air bag structure 40 that provides an effective method of controlling the inflation of the air bag structure. Any particular type of outer air bag may be used with the molded monolithic inner air bag 40B of the present invention. An example of an outer air bag that is formed from a front panel that is sewn to a rear panel is shown in U.S. Pat. No. 5,249,824, which is herein incorporated by reference in its entirety.

FIGS. 5–8 illustrate a further embodiment of the present invention. As shown in FIGS. 5 and 6, the inner bag 140B of this embodiment of the present invention comprises a rear portion or panel 164 and a front portion or panel 166. The panels have vent holes 160 and/or rises 220 (such as raised or thickened portions around the vent holes 160, inlet 148, and in the center of front panel 166), which rises function as a reinforcement for the panels. Although each panel can be shaped from a sheet of material with reinforcements added thereto, each panel should, preferably, be formed by injection molding to reduce material loss and to simplify the manufacturing process.

The inner bag 140B is composed of a thermoplastic elastomer, preferably urethane, although polyester, polyamide, or polyolefin are suitable. The inner air bag can be formed by various processes, such as: injection molding, blow molding, or heat sealing of sheets. Although each of these manufacturing processes has its own difficulties, all of them provide an improved manufacturing technique when compared to sewing fabric panels together. For example, after injection molding the inner air bag it is difficult to remove the core mold die from the inner cavity of the formed air bag, while in a blow molding process it is not easy to attain uniform wall thickness of the air bag panels. Heat sealing of the panels used to form the inner air bag will damage and weaken the sheets if this manufacturing method is not carefully undertaken. The disclosed, preferred method for forming the inner air bag of the present invention eliminates theses problems.

As shown in FIG. 7 and 8, the rear 164 and front 166 panels are connected by an edge 200. In the preferred manufacturing process, each of the first panel and the second panel is separately formed by injection molding. Then, the connecting edge 200 is also formed by injection molding such that a bonded portion is formed between the first panel and the second panel. The material for the connecting edge, preferably, should be the same as the front and rear panels so that the injected material (resin) impregnates the edges of each of the panels so that the interface between injected material and the material of each of the panels disappears and appears uniform. It is to be understood that a different material can be used for each of the rear panel, the front panel, and the connecting edge, as long as each of the materials will join with the associated material during the injection molding process.

As discussed above in conjunction with FIGS. 1–4, it is to be understood that, although not shown, the inner air bag of FIGS. 5–8 is also installed in a dual air bag assembly for a passenger restraint system. When assembled, the dual air bag assembly has an outer bag with an internal cavity, an inlet opening, and vent holes, while the inner bag 140B, which also has an inlet opening 148 and vent holes 160 on a rear panel 164, is disposed within the internal cavity of the outer bag. Rather than having vent hole 160 located in the rear panel or portion 164, the inner air bag can be provided with vent holes on its side. That is, a portion of the vent hole is located in both the rear and front panels of the inner air bag.

Both outer and inner air bags are fastened together to a structural part around an inflator through their inlet openings. When the inflator is ignited, gas flow is directed into the inner bag, and then the gas flow is directed toward the outer bag through the vent holes of the inner bag to fully inflate the outer air bag.

As discussed above, the prior art discloses other materials besides thermoplastic elastomers as the material of the inner air bag. Prior to the present invention, the importance of the relationship between the material of the inner bag and the kinetic energy absorption capability of the inner bag was not known and not given much attention.

Table 1 shows the effects of the material of the inner bag, where urethane is used as a representative of thermoplastic elastomer material for the inner air bag of the present invention. In the experiment, 40 kg of an impact mass was launched toward a fully inflated air bag fixed on a steering wheel. The air bag received the impact mass and, therefore, the kinetic energy of the impact mass was absorbed by the air bag. The following results were obtained:

TABLE 1

| Model No. | Material of the Inner Bag | Impact Mass Velocity km/h | Energy Absorption N ° m |
|---|---|---|---|
| 149 | urethane | 35.4 | 1846 |
| 150 | urethane | 35.5 | 1836 |
| | Average | 35.5 | 1841 |
| 166 | nylon fabric | 35.3 | 1826 |
| 167 | nylon fabric | 35.2 | 1812 |
| | Average | 35.3 | 1819 |
| 184 | no inner bag | 35.4 | 1834 |
| 190 | no inner bag | 35.2 | 1839 |
| | Average | 35.3 | 1837 |

These tests were conducted with three types of air bags; each having the same nylon outer air bag. As shown from Table 1, the dual air bag with the urethane inner bag of the present invention absorbed much more energy than the dual air bag with the nylon fabric inner bag. Table 1 also shows that the kinetic energy absorbed by the dual air bag with the urethane inner bag is comparable to that of an air bag with tethers and no inner air bag, while the nylon fabric inner bag has limited contribution to this performance.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. An air bag for a vehicle, said air bag comprising:
   an outer air bag having an internal cavity;
   an inner air bag being disposed within said internal cavity, said inner air bag including a first portion, a second portion and an air-tight seam between said first portion and said second portion; and
   at least one device for controlling inflation gas flow between said inner and said outer air bags;
   wherein said at least one inflation gas flow control device comprises a discontinuity in said airtight seam.

2. The air bag recited in claim 1, wherein said inner air bag is formed from a thermoplastic elastomer.

3. The air bag recited in claim 1, wherein the inner air bag is a molded unitary material.

4. The air bag recited in claim 1, wherein said at least one inflation gas flow control device comprises at least one vent hole.

5. The air bag recited in claim 1, wherein said at least one inflation gas flow control device comprises at least one element selected from the group consisting of a weakened portion and a vent hole.

6. The air bag recited in claim 5, wherein the weakened portion is at least one of the following structural features provided in a material of said inner air bag: slots, tears, cuts, cross-cuts, thinned material section and pin hole.

7. The air bag recited in claim 4, wherein said at least one inflation gas flow control device comprises four vent holes.

8. The air bag recited in claim 1, wherein said at least one inflation gas flow control device includes four vent holes each disposed partially in said first portion and partially in said second portion.

9. The air bag recited in claim 1, further comprising at least one vent hole provided in at least one of said first portion and said second portion and at least one weakened portion provided in at least one of said first portion and said second portion.

10. The air bag as recited in claim 1, wherein said first portion and said second portion comprise a first panel and second panel, respectively, and said air-tight seam comprises a connecting edge.

11. The air bag as recited in claim 2, wherein the thermoplastic elastomer is selected from the group including: urethane, polyester, polyamide, and polyolefin.

12. The air bag recited in claim 1, wherein said at least one inflation gas flow control device comprises at least one of a vent hole and a weakened portion.

13. The air bag recited in claim 2, wherein said air-tight seam is a thermoplastic bond.

14. The air bag recited in claim 13, further comprising:
an inlet portion of said outer air bag; and
an inlet portion of said inner air bag;
wherein said inlet portions are mutually aligned and fastened in common to the vehicle.

15. The air bag recited in claim 14, further comprising:
at least one strengthened portion adjacent said inlet portion of said inner air bag.

16. The air bag recited in claim 15, wherein the inner air bag is provided with three annular strengthened portions, each with a different strength level, adjacent said inlet portion of said inner bag.

17. The air bag recited in claim 16, wherein one of said strengthened portions surrounds a plurality of mounting holes.

18. The air bag recited in claim 1, wherein said airtight seam includes a plurality of segments, and each of a plurality of said inflation gas flow control devices comprises one of said discontinuities in a respective one of said plurality of segments.

19. A method of forming an air bag, said method comprising the steps of:
molding a first thermoplastic panel and a second thermoplastic panel;
connecting said first thermoplastic panel to said second thermoplastic panel by a thermoplastic edge to generally define an inner cavity;
providing at least one inflation gas flow control device along the thermoplastic edge; and
disposing said first and second thermoplastic panels connected by said thermoplastic edge in an outer air bag;
wherein said inflation gas flow control device directs a gas flow from said inner cavity for inflating said outer air bag.

20. The method of claim 19, further comprising the step of providing said first thermoplastic panel, said second thermoplastic panel, and said thermoplastic edge with the same thermoplastic material.

21. The method of claim 19, wherein the step of connecting includes bonding said thermoplastic edge to said first and said second thermoplastic panels by injection molding.

22. The method of claim 19, wherein said inflation gas flow control device comprises a vent hole.

\* \* \* \* \*